United States Patent [19]

Sherman

[11] 4,117,996
[45] Oct. 3, 1978

[54] VARIABLE AERODYNAMIC COMPRESSION FLAPS

[76] Inventor: Irving R. Sherman, 8045 E. Douglas Ave., Apt. 205, Wichita, Kans. 67207

[21] Appl. No.: 787,846

[22] Filed: Apr. 15, 1977

Related U.S. Application Data

[63] Continuation of Ser. No. 589,188, Jun. 23, 1975, abandoned.

[51] Int. Cl.² .............................................. B64C 3/28
[52] U.S. Cl. .................................. 244/212; 244/12.4; 244/204; 244/215
[58] Field of Search .................... 244/12.4, 23 A, 198, 244/201, 204, 207, 208, 209, 212, 213, 214, 215, 216, 218, 53 B; 137/15.1, 15.2

[56] References Cited

U.S. PATENT DOCUMENTS

| | | | |
|---|---|---|---|
| 1,945,254 | 1/1934 | Bittner | 244/216 |
| 2,136,403 | 11/1938 | Vance et al. | 244/204 |
| 2,222,935 | 11/1940 | Chilton | 244/218 |
| 2,772,058 | 11/1956 | Grant | 244/216 |
| 2,891,740 | 6/1959 | Campbell | 244/207 |
| 2,964,264 | 12/1960 | Multhopp | 244/12.4 |
| 3,441,236 | 4/1969 | Arnholdt | 244/204 |
| 3,447,763 | 6/1969 | Allcock | 244/215 |
| 3,478,988 | 11/1969 | Roed | 244/212 |
| 3,837,601 | 9/1974 | Cole | 244/216 |

FOREIGN PATENT DOCUMENTS

| | | | |
|---|---|---|---|
| 76,660 | 10/1961 | France | 244/201 |
| 688,452 | 2/1940 | Fed. Rep. of Germany | 244/213 |
| 698,768 | 10/1940 | Fed. Rep. of Germany | 244/216 |
| 366,844 | 10/1937 | Italy | 244/204 |

*Primary Examiner*—Galen L. Barefoot
*Attorney, Agent, or Firm*—Littlepage, Quaintance, Murphy, Richardson and Webner

[57] ABSTRACT

Aircraft flaps provide rearwardly convergent channels which terminate at or near the trailing edges of the flaps. The forward intakes of the channels are closed when the flaps are elevated and open when the flaps are depressed. A control is programmed to operate the flaps so as to maintain minimum drag until sufficient ground speed is attained for take-off, and to limit the velocity of air discharged from the channels to sub-sonic speeds.

4 Claims, 22 Drawing Figures

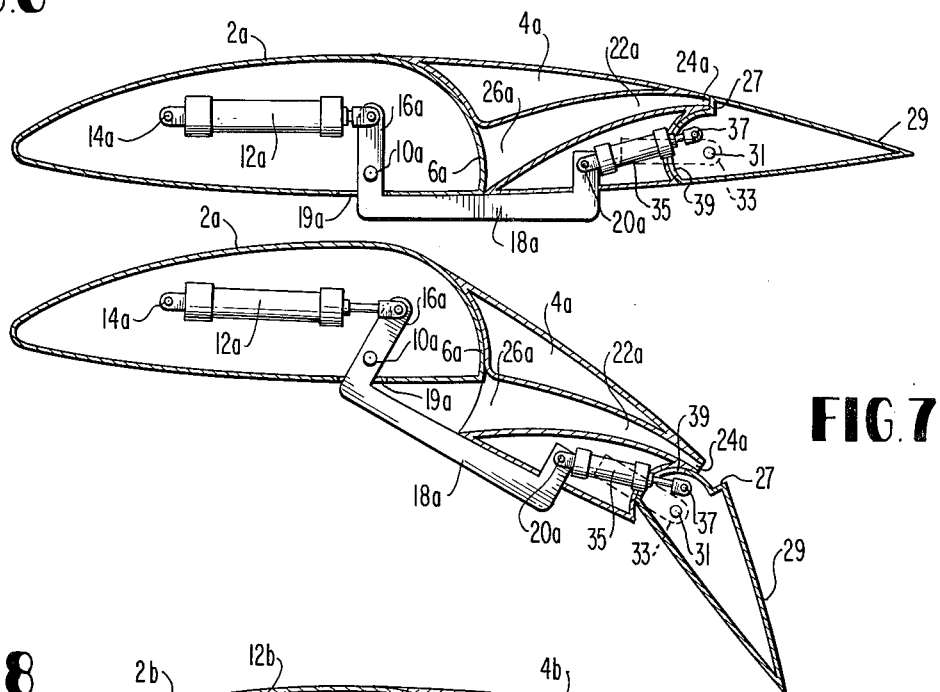
FIG.6
FIG.7
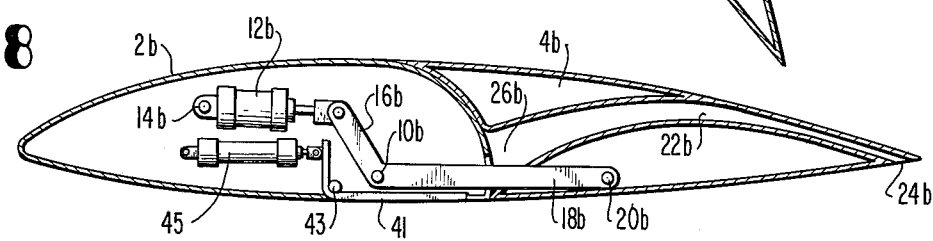
FIG.8
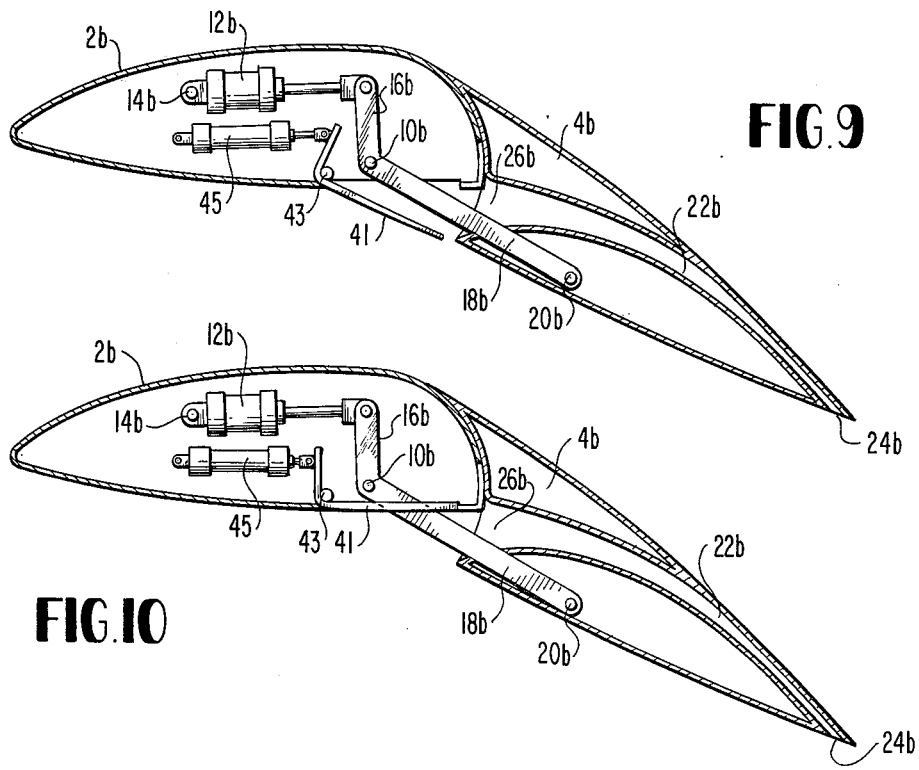
FIG.9
FIG.10

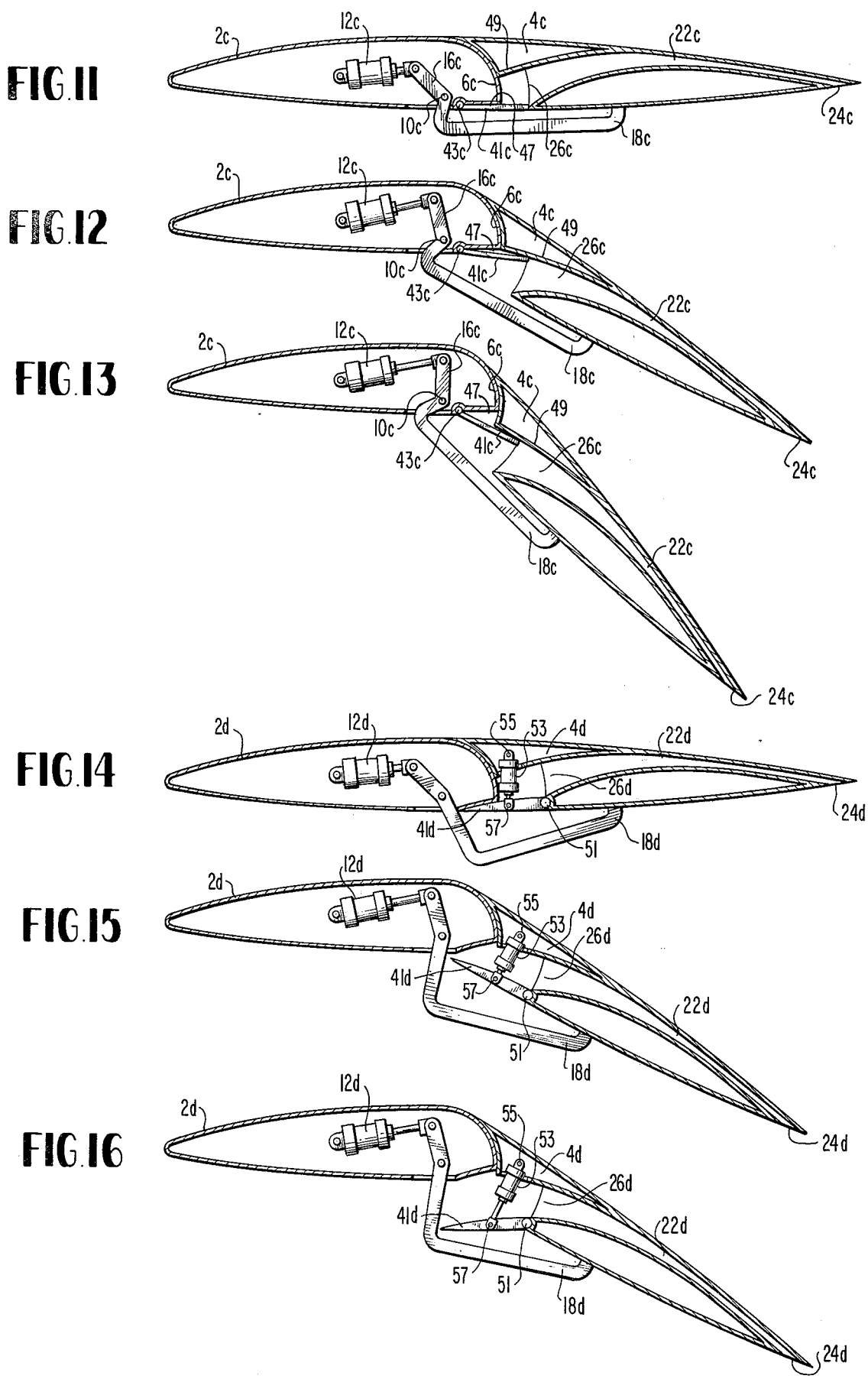

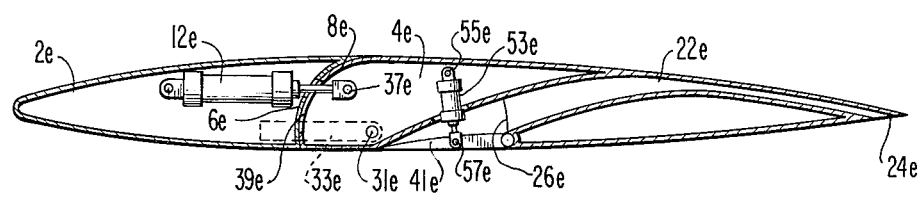
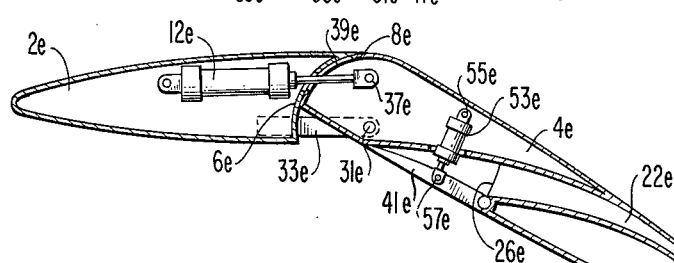
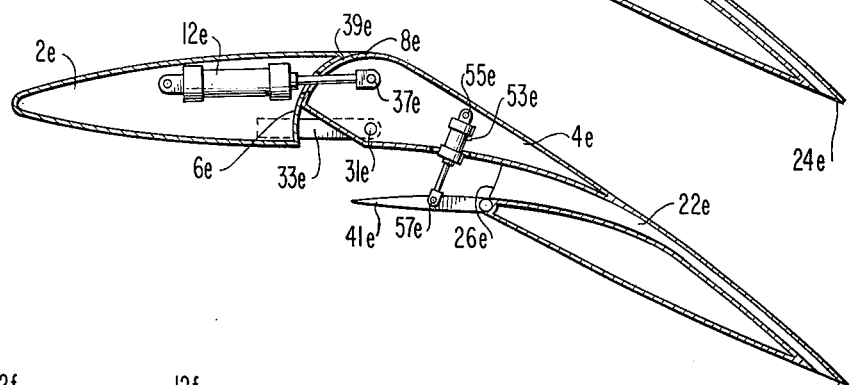
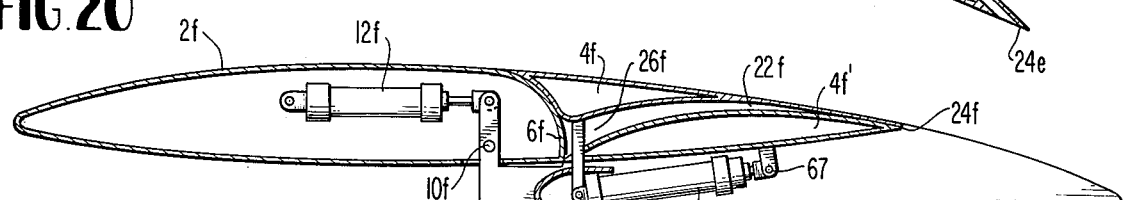
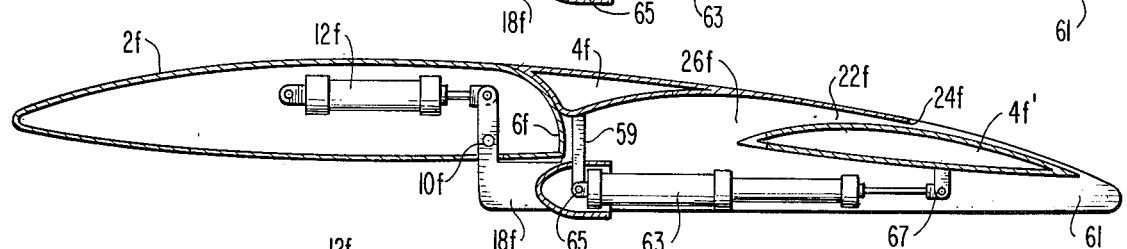
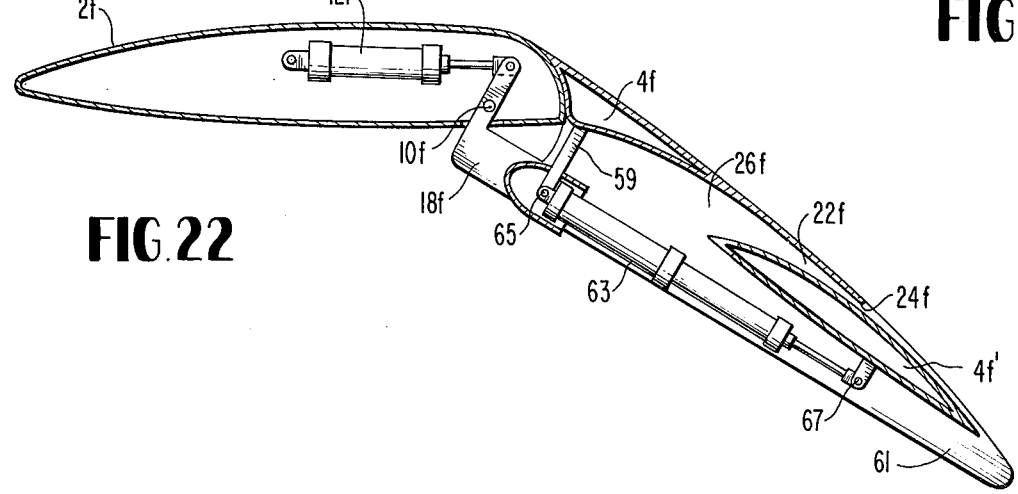

VARIABLE AERODYNAMIC COMPRESSION FLAPS

This is a continuation of application Ser. No. 589,188 filed June 23, 1975, now abandoned.

FIELD OF INVENTION

Aeronautics, Aircraft Sustension, Variable Flaps and/or spoilers.

PRIOR ART

Campbell U.S. Pat. No. 2,891,740; Allcock U.S. Pat. No. 3,447,763; "Recent Advances in Aerodynamics for Transport Aircraft" by Lloyd T. Goodmanson and Louis B. Gratzer, Astronautics and Aeronautics, December, 1973; "Assesment of Lift Augmentation Devices" Agard LS-43-71, February, 1971.

OBJECTS

Heretofore, jet flaps have been used to provide high lift and to deter stalling of the aircraft's wing. Usually, part of the engine compressor air is channeled through the flap so that it exits at or near the trailing edge of the flap. This adds energy to the flow of air over the wing which increases lift and reduces the tendency of the wing to stall. A considerable amount of engine power is needed for blowing the flaps, and the distribution of the high pressure air uniformly along the flaps is difficult. The Campbell patent (supra) discloses an externally blown flap which eliminates the internal piping problems and provides a rearwardly convergent channel through a flap. However, the front end of the channel is always open, and the compression ratio of the channel is not variable. These characteristics are considered to be disadvantageous. Also, in event of engine failure on one side of the aircraft, a severe rolling is created.

The object of this invention is to achieve the advantages of a jet flap by means of a rearwardly convergent channel through the flap, plus means to control the intake of the channel and thereby control the speed of the air discharged from the channel. Stated negatively, the advantages of a jet flap or an augmented jet flap are attained without an external source of power to create the high velocity jet.

Taking into account that, where there is a rearwardly convergent channel through a flap (and wherein the intake of the channel is on the under side of the flap when the latter is depressed or extended), the forward end of the channel functions as an air scoop. If the intake of the channel were open during the take-off ground run, the momentum drag of the air flowing through the channel would be excessive and, consequently, the take-off distance would be very large. However, in accordance with this invention, it is intended to provide a channeled flap which is normally closed at brake-release, thereby minimizing momentum drag. The flap is depressed and the channel is opened when the aircraft approaches take-off velocity. In the simplest embodiment of the invention, opening of the channel is accomplished by depressing the flap. In other embodiments, shutters for the channel intake permit lowering of the flap without necessarily opening of the channel. In all embodiments, the volume flow and/or the compression ratio of the channels is made variable, and this variation is made subject to automatic control.

A further object of this invention is to provide a flap having a large channel of sufficient length to efficiently provide a high compression ratio. In this context, compression ratio refers to the relationship of the depth of the channel at intake $to$ to the depth of the channel at exit $tj$. A further requirement is that the exit velocity of the air discharged from the channel exit shall be as high as possible (thereby to add as much energy as possible to the airstream flowing over the wing) while still remaining below the speed of sound. Otherwise the flap will "screech". For example, if the lift-off velocity is 100 ft./sec. and if the air jet exit velocity is to be 1,000 ft./sec. at lift-off, then the dimension of $to$ will be approximately 10 times that of $tj$. In practice, the compression ratio is varied, reaching its maximum at or near to lift-off speed (10 to 1 in this example) going from zero at start of the ground run to maximum at lift-off and is then reduced to zero at flaps-up speed.

This invention is in contrast with fixed geometry, non-variable single, double, or triple slotted flaps where the channels are short and the jet momentum obtained is small. For them, a pressure differential is used to feed air from below to above the airfoil to produce a modest increase in momenum intended to deter separation of the airstream from the airfoil. Their intakes are shaped and sized to minimize drag. On the other hand, in this invention the channels utilize a large scoop intake, which has a very large drag, in order to compress a large quantity of air since the lift increase depends on the quantity of air scooped. Hence, it is necessary to control the flap so as to limit drag and thus allow the aircraft to accelerate readily to lift-off velocity.

The foregoing gives rise to the major aspect of the invention, namely, the provision of a flap control system to operate the flaps in accordance with the airspeed of the aircraft. More specifically, it is intended to program the flap control so that, at the time of brake release, the flaps are elevated, and, upon reaching a speed close to lift-off speed at which further acceleration required is small, the flaps are depressed or extended to obtain high lift.

Depression of the flaps, plus the increasing airspeed would soon result in an exit velocity of the air passing through the channels which would reach the speed of sound. While this would increase the lift, it would also cause severe noise which is most undesirable. The system can be designed such that the aircraft lift-off airspeed coincides with exit sonic velocity, thereby creating a brief audible signal to the pilot to rotate the aircraft for lift-off.

After lift-off, the flaps are gradually raised or the shields are lowered so as to hold the exit velocity of the air discharged from the flap channels to subsonic speeds. This also reduces drag which allows the aircraft to climb faster.

During landing, a comparable but somewhat different program may be followed, since the aircraft must be kept above minimum control speed until touch-down and the flaps can be retracted during ground roll to allow the weight of the aircraft to assist in braking.

The foregoing objectives are achieved by means of both single and multiple flaps of various configurations, as will be apparent in the following specification and drawings, in which:

FIG. 6 is a view similar to FIG. 1, but showing the invention applied to a double flap, and showing the flaps elevated;

FIG. 7 shows the double flaps of FIG. 6 in extended position;

FIG. 8 is a diagrammatic cross section through a modified flap arrangement utilizing a programmed shutter so that the flap may be depressed independently of the opening of the channel mouth, showing the flap elevated;

FIG. 9 is a view similar to FIG. 8, but showing the flap depressed and the shutter open;

FIG. 10 is a view similar to FIG. 9, but showing the shutter open;

FIG. 11 shows a modification of the shutter of FIGS. 8, 9 and 10 in a flap wherein channel intake is closed by the self-actuated shutter when the flap is elevated, as shown;

FIG. 12 shows the FIG. 11 modification with the flap partly depressed;

FIG. 13 shows the FIG. 11 modification with the flap fully depressed;

FIG. 14 shows a modification of the shutter of FIGS. 8, 9 and 10, but utilizing an actuated intake shutter which can be independently controlled in all positions of the flap, wherein the flap is elevated and the shutter closed;

FIG. 15 shows the FIG. 14 modification wherein the flap is depressed and the shutter closed;

FIG. 16 shows the FIG. 14 modification wherein the flap is depressed and the shutter open;

FIG. 17 shows a modification of the flap shown in FIG. 14, wherein, however the leading edge of the flap is of convex configuration, and wherein the flap is elevated and the shutter is closed;

FIG. 18 shows the FIG. 17 modification wherein the flap is depressed and the shutter is closed;

FIG. 19 shows the FIG. 17 modification wherein the flap is depressed and the shutter is open;

FIG. 20 shows a further modification utilizing a main flap and an extensible flap wherein the channel is formed by extending the extensible flap below the main flap, and wherein the main flap is elevated and the extensible flap retracted;

FIG. 21 is a view showing the modification of FIG. 20 wherein the main flap is elevated and the extensible flap is extended; and, FIG. 22 shows the modification of FIG. 20 wherein the main flap is depressed and the extensible flap is extended.

Certain definitions may assist those skilled in the aerodynamic arts to understand and facilitate use of this invention.

$T_j$ = Jet thrust
$C_j$ = Jet momentum coefficient
$M_j$ = Mass of air flowing through channel
$C_t$ = Jet thrust coefficient
$q$ = Dynamic pressure of free airstream
$q_j$ = Dynamic pressure of the jet
$s$ = Wing area
$c$ = Wing chord
$K$ = Compression ratio of channel
$v$ = Airspeed
$V_j$ = Jet exit velocity
$t_o$ = Depth of intake
$t_j$ = Depth of exit
$Q_j$ = Volume flow of air through channel
$\rho_j$ = Air density
$A_j$ = Cross sectional area of jet By defininition, $$C_j = M_j v_j / qs$$

The thrust coefficient $C_T$ is slightly larger than the momentum coefficient $C_j$, since the jet thrust $T_j$ is equal to momentum $M_j v_j$ plus a small force due to entrainment.

$$C_j \approx C_T = T_j/qs$$

The compression ratio K is defined by:

$$K = V_j/V = t_o/t_j = (t_o/C)/(t_j/C) = \text{Ratio of intake to exit area.}$$

By repeated substitutions:

$$C_j = (M_j V_j)/q_s = (Q_j \rho_j V_j)/q_s = [(\rho_j V_j^2)/q](A_j/s) = 2(q_j/q)(A_j/S) = 2(V_j/V)^2(t_j/c) = 2K^2(t_j/c)$$

Where the final form facilitates design optimization.

Figure 3:
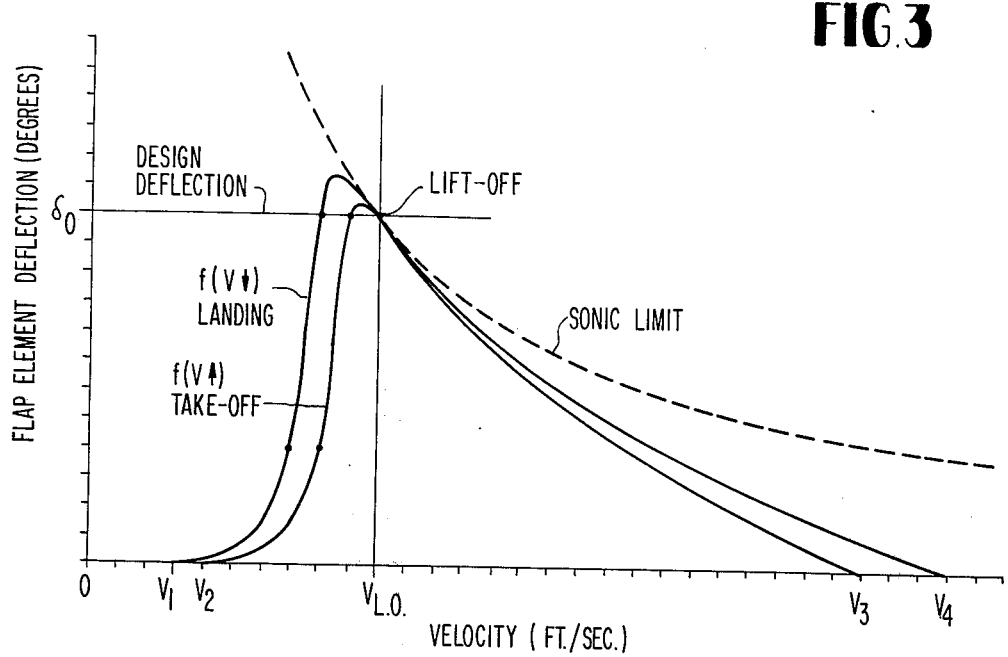
FIG. 3 is a graph illustrating a sample mathematical model which governs the operation of the flaps during take-off and landing.

A major problem with such systems occurs when the jet exit velocity $v_j$ exceeds the speed of sound, thus causing excessive noise by approaching the sonic limit. Permissable values of exit velocity $v_j$ lie below the sonic limit which is a hyperbolic curve conveniently plotted on a graph of K versus V. The relevant portion of this curve is illustrated in FIG. 3, on which extreme values have been omitted. The sonic limit cannot be exceeded by a convergent channel. A convergent-divergent lavalle channel can exceed sonic exit velocities.

Figure 4:
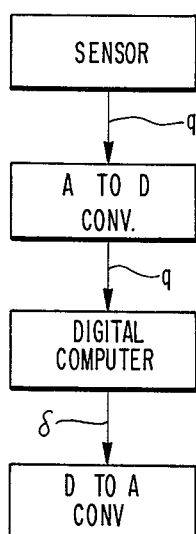
FIG. 4 is a block diagram of the computer and related apparatus which perform the control according to the mathematical model of FIG. 3.
Figure 4:
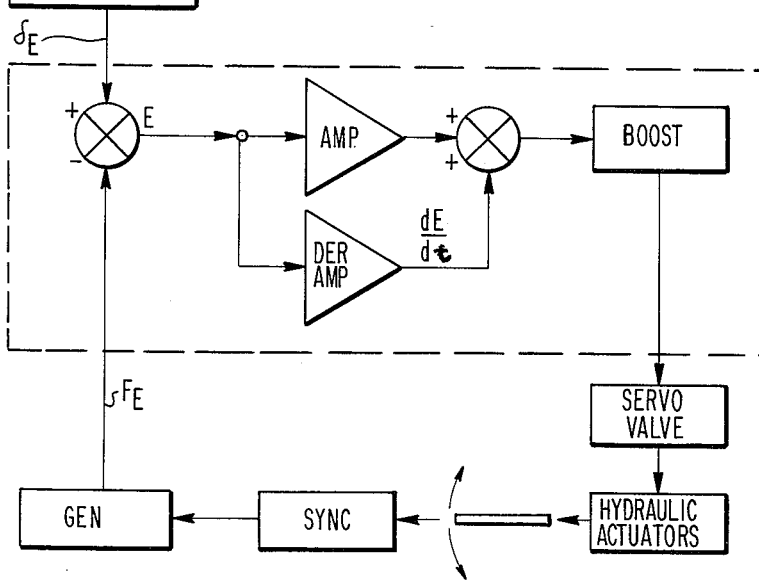

FIG. 4 is a block diagram of a control system for controlling the operation of the flaps. Because the channels cause great drag when the flaps are down, it is desirable that they be open only when the extra lift which they provide is needed, so that their drag does not impose an intolerable penalty upon the acceleration of the aircraft. It is also desirable that they be opened only so much as can be done without causing the excessive noise which results when the air passing through the passages approaches the sonic limit.

FIG. 3 is a plot of the angle of deflection $\delta$ of the flaps, which for the simplest flaps shown determines the opening of the channels, as a function of the indicated air speed of the aircraft. The sonic limit is indicated by the dash-line curve on this figure, with the portion below and to the left part of the figure representing subsonic flow through the passages and the portion above and to the right representing supersonic flow for convergent-divergent channels but inaccessable to convergent channels.

Two functions are plotted on this figure and each illustrates a mathematical model of predetermined flap deflection as a function of indicated air speed. One function, $fV$ rising, indicates commanded deflection at different air speeds for use in take off, and the other function, $fV$ falling, indicates commanded deflection at different air speeds for use in landing. These functions are determined by preliminary estimates followed by take-off and landing flight tests wherein the objective is to obtain the desired additional lift while maintaining minimum drag at lower and higher speeds where the extra lift is not required. In the preferred and illustrated embodiment, the channel exit velocity is arranged to just touch the sonic limit curve, thereby providing maximum lift at take-off and a brief audible signal to the pilot that the plane is passing through the lift-off air speed. The $\delta/V$ rising and the $\delta/V$ falling functions illustrated in FIG. 3 are stored in an on-board digital computer, preferably in read-only memories, such that, when any air-speed value is provided to the memory, the appropriate flap deflection value can be read out of the memory. The $\delta/V$ falling function rises from a zero value of flap deflection at the flaps-down airspeed $V_4$ and returns to zero value at $V_1$ following touch-down. The $\delta/V$ rising function rises from a zero value of flap deflection at $V_2$ during take-off ground run and returns to a zero value at flaps-up air speed at $V_3$.

Referring again to FIG. 4, a sensor X2 generates an electrical signal $q'$, of the type commonly generated on board aircraft as a dynamic impact pressure voltage $q' = (\rho v^2)/2$, where $\rho$ is air density and $V$ is air velocity of the air passing the aircraft and indicative of its effective velocity. Such a sensor contains pilot and static tubes, a diaphragm and linear variable differential transformers (LVDT's), and is found on most aircraft. The signal $q'$ from sensor X2 is converted by an analog-to-digital converter X4 to a digital value $q$ for application to a digital computer X6.

Figure 5:
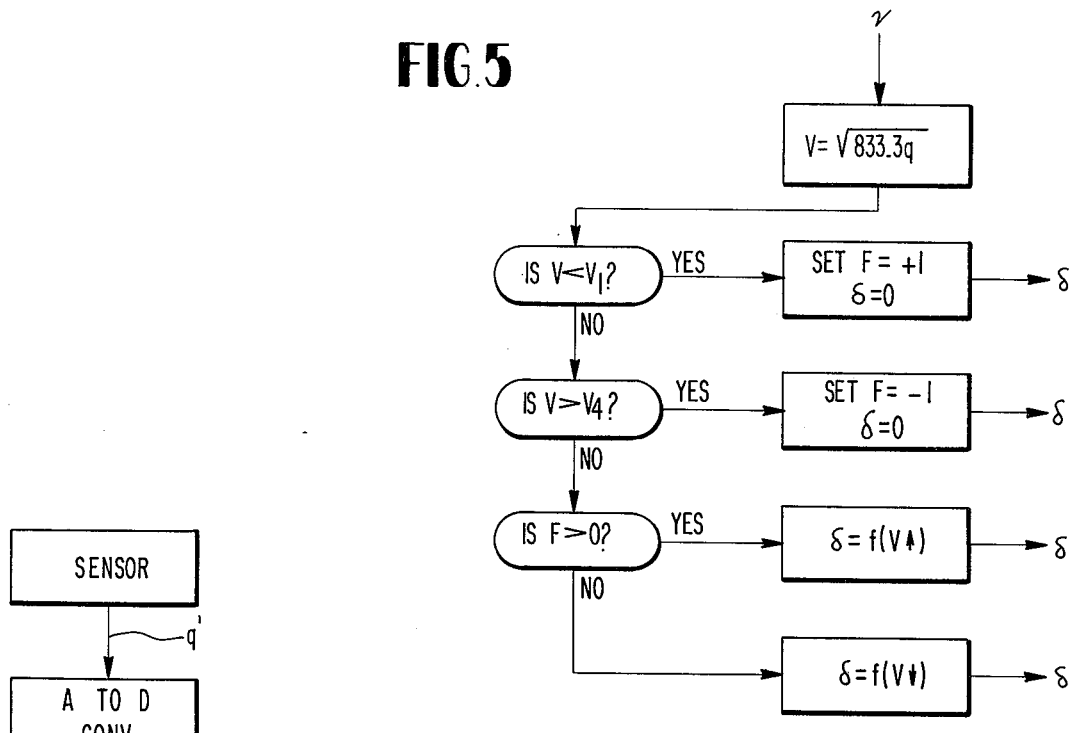
FIG. 5 is a logic diagram for the computer when separate take-off and landing models are used.

FIG. 5 is a flow chart of the operations performed by digital computer X6. The airplane velocity V is first computed by the equation $V = \sqrt{833.3q}$, using the value of $q$ from converter X4. The computer than determines if V is less than the value of $V_1$ stored in the read-only memory. If V is less than $V_1$, the computer sets a flag bit F equal to plus one and sets the output flap deflection signal for $\delta$ equal to zero. If V is not less than $V_1$, the computer then determines if V is greater than the value of $V_4$ stored in the read-only memory. If V is greater than $V_4$, the computer sets the flag bit F equal to minus one and set $\delta = 0$. If V is not greater than $V_4$, the computer then determines if the flag bit F is greater than zero. If F is greater than zero, the computer "knows" that the velocity is between $V_1$ and $V_4$ and that plane is attempting a take off since its velocity was at $V_1$ more recently than it was at $V_4$. Then the computer uses the calculated value of V to enter the read-only memory and read out a flap deflection value $\delta$ from the $fV$ rising (take-off) curve as in FIG. 3. But if F is not greater than zero, the plane is landing, and the flap deflection value $\delta$ is read from the $fV$ falling (landing) curve from FIG. 3.

The deflection signal values $\delta$ from computer X6 are applied to a digital-to-analog converter X8 to derive an analog value $\delta_E$ of deflection signal $\delta$. The analog value is applied as one input to an operational amplifier system. A feedback signal $F_E$, the derivation of which is discussed below, is applied to a summing point X10 to derive a difference signal $E = \delta_E - F_E$. The difference signal E is supplied in parallel to a linear amplifier X12 and to a derivative amplifier X14. The outputs of these two amplifiers are summed at a summing point X16 and boosted for application to an electrohydraulic servovalve, the output of which drives hydraulic actuators X20. The actuators X20 drive flaps X22, as shown in much greater detail in accompanying figures. A synchro X24 serves as an angular position transducer for converting flap movement to a signal which a generator X26 can follow to generate the feedback signal F. Thus the flaps X22 are controlled to deflection values as illustrated in FIG. 3.

In the ensuing specification, an elementary form of the invention as applied to an airfoil and flap are described first, followed by a definition of terms, and description of the control and the laws of operation thereof. Subsequently, various modifications of airfoils and flaps embodying structural aspects of the invention are described. The drawings are diagrammatic only, the structural details which are well known in the art having been eliminated for purposes of clarity and for emphasis of the invention. In the description of structural embodiments subsequent to the first, lower case suffix letters are applied to the reference numerals previously used in the description of corresponding elements.

Figure 1:
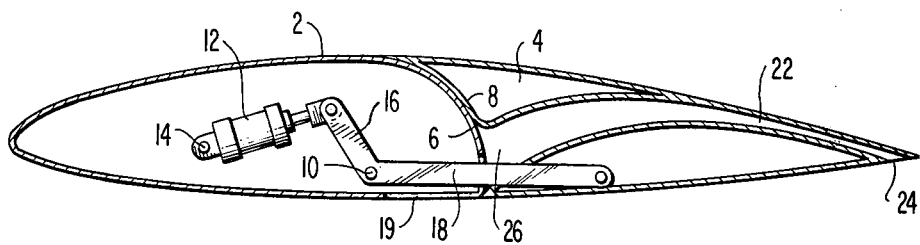
FIG. 1 is a diagrammatic cross-section through an airfoil and illustrates a compressor flap of the simplest of configurations, showing the flap elevated.
Figure 2:
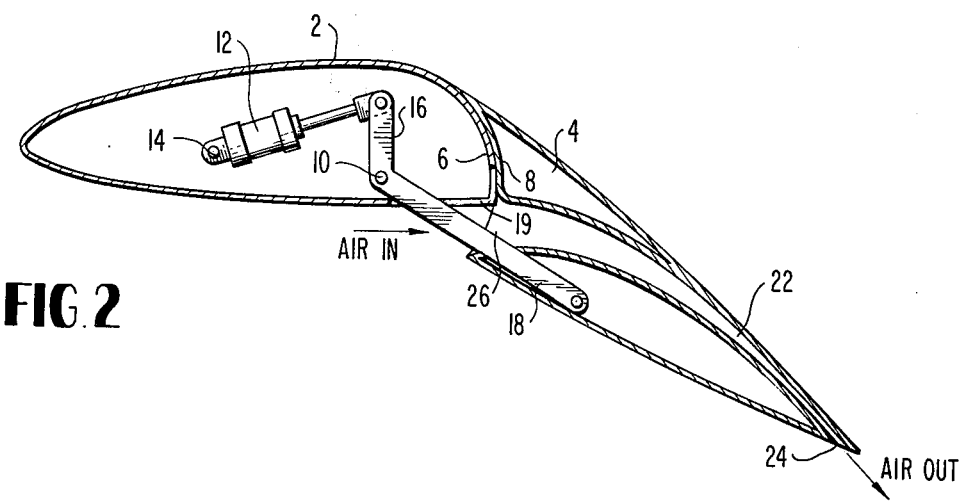
FIG. 2 is a view similar to FIG. 1 showing the flap depressed.

FIGS. 1 and 2 diagrammatically illustrate a wing 2 having attached thereto a flap 4. The trailing edge 6 of the wing is convex, and the leading edge of flap 8 is concave, both being along arcs of the radius of pivot 10 about which flap 4 swings. Extending from front to rear through flap 4 is an elongate channel 22 whose exit end 24 terminates at or near the trailing edge of the flap. The essential feature of the location of the exit 24 of channel 22 is that it be so positioned as to inject a jet thrust into the stream of air flowing over the airfoil and thus add energy to it. The intake end 26 is in or near the leading edge of the flap.

When flap 4 is elevated, intake 26 is closed. In this instance, the intake 26 of the channel is masked by the trailing end 6 of airfoil 2 when the flip is elevated, and no further mechanism to achieve this masking is needed.

Upon actuation of ram 12, flap 4 is lowered and, as it starts to lower, intake 26 starts to open until, as illustrated in FIG. 2, when the flap is fully lowered, intake 26 is fully open, and no additional mechanism is used to achieve this opening.

This type of flap is exteriorly rotational, a characteristic which permits the wing box to be relatively large. Slits 19 in the wing box permit the arm 18 of lever 16 to swing down. In this embodiment the exit end 24 of channel 22 is at the extreme rear of the lower surface of the flap.

FIGS. 6 and 7 diagrammatically illustrate a modification of the invention. The exteriorly rotational flap 4a is swung about pivot 10a by the force of ram 12a on lever 16a. In this case, an exterior lever arm 20a is used to minimize the certs or slits in the wing box. Only a small slit 19a in the wing box is needed to accommodate arm 20a. In this embodiment, as in the one previously described, the intake end 26a of channel 22a is masked by the rearwardly convex trailing edge 6a of wing 2a, and opened when the flap is depressed. However, in this case the exit end 24a of channel 22a is closed and opened according to the position of a shoulder 27 on an suxiliary flap 2a attached to the rear of flap 4a.

In this case a pivot 31 on auxiliary flap 29 is supported by an arm 33 which is rigidly affixed in flap 4a. Suxiliary flap 29 is actuated by a ram 35, one end of which is attached as at 20a to flap 4a, and the other end of which is attached to a pivot 37 in auxiliary flap 29 which is offset from the pivot 31 about which the auxiliary flap swings. A slit 39 in the forwardly convex leading end of auxiliary flap 29 accomodates the rear end of ram 35.

In the embodiment of FIGS. 6 and 7, flap 4a and auxiliary flap 29 can be depressed while maintaining the rear end of channel 22a closed. Normal flap lift can thus be obtained without the severe drag penalty imposed when channel 22a is opened. When the aircraft attains sufficient velocity so that the drag is tolerable, auxiliary flap 29 is depressed so as to open the exit end of channel 22a. Thus channel 22a can be opened and closed when flap 4a is depressed.

FIGS. 8, 9 and 10 illustrate a further embodiment wherein the channel 22b can be opened and closed when flap 4b is depressed. The basic structure is identical to that of the embodiment of FIGS. 1 and 2 and hence need not be described. However, in this case a shutter 41 on the lower rear side of wing 2b is pivoted as at 43 and actuated by a ram 45. When flap 4b is depressed, ram 45 may be actuated so as to shield the entrance end 26b of channel 22b (FIG. 9). When a velocity approaching that required for lift-off is attained, the intake 26b of channel 22b is opened by raising shutter 41 to its FIG. 10 position. The thrust of the jet issuing from exit 24b can then achieve lift augmentation.

FIGS. 11, 12 and 13 diagrammatically illustrate an embodiment wherein the intake 26c 1 of channel 22c is partly closed by the rearwardly concave trailing edge 6c of wing 2c when the flap is elevated, the remainder of the intake being closed by a shutter which is suitably biased upwardly, as by a torsion spring (not shown) around its pivot 43c. As flap 4c moves from elevated position (FIG. 11) to a partly depressed position (FIG. 12) shutter 41c at first remains in its original position, stopped against the offset surface of a shallow recess 42 in lower rear surface of wing 2c. However, as flap 4c continues to move towards its partly depressed position (FIG. 12) shutter 41c is engaged by the lower front surface 49 of the upper wall of channel 22c. Thence to the fully depressed position of flap 4c (FIG. 13) shutter 41c following the motion of the flap. FIG. 12 illustrates a 30° flap deflection such as used for take-off, and FIG. 13 illustrates a 45° flap deflection such as used for landing.

In this case the recess 47 houses the forward portion of shutter 41c when flap 4c is elevated, so that the shutter lies flush with the lower surface of the wing, and when flap 4c is fully depressed, shutter 41c serves as a ramp to guide the inflowing air into the intake end of channel 22c. In addition, this arrangement, as well as those of the embodiments described hereinafter, permit comparatively thin airfoil sections to be used.

FIGS. 14, 15 and 16 diagrammatically illustrate a wing and flap assembly similar to that shown in FIGS. 11, 12 and 13, except that shutter 41d is pivoted at 51 to the lower leading portion of flap 4d, and is actively controlled by a ram 53 connected at 55 and 57 to the flap and shutter. As in FIGS. 11-13, the rear end of lever arm 18d is affixed to the flap, and, in this case, a slit (not shown) is provided in the shutter to accommodate the lever arm when the flap is fully depressed.

The entrance end of channel 22d can be opened or closed by shutter 41d, and when the latter is depressed, as in FIG. 16, the shutter functions as a scoop to feed air into the channel.

FIGS. 17, 18 and 19 diagrammatically illustrate a further modification of the concept illustrated in the previous FIGS. 14, 15 and 16. In contrast with the previous embodiment, wherein the entrance end 26d of channel 22d is partly closed by the rearwardly convex trailing edge of the wing, here the closing and opening of the entrance end of the channel 22e is controlled entirely by the shutter 41e. In this case the shutter is internally rotatable in that it swings about a pivot 31e which, in turn, is supported by an arm 33e extending rearwardly from wing 2e, the trailing edge 63 of the wing is rearwardly concave, and in it nests the forwardly convex leading edge 83 of the flap. The flap is swung by a ram 12e whose actuator is connected to a pivot 37e in the flap which is offset from pivot 31e. A slit 39e in the leading edge of flap 4e accommodates the ram actuator. While the entrance end 26e of channel 22e is in the forward portions of flap 43, it cannot be masked by the trailing edge of the wing because of the internal rotative configuration of the flap.

FIGS. 20, 21 and 22 illustrate a still further embodiment, utilizing a translation flap. Here, as in the embodiment of FIGS. 6 and 7, the externally rotatable flap 4f is swung about a pivot 10f by a ram 12f, the rear end of the lever arm 18f is secured to the lower front part of flap 4f which is braced as to 59 to the upper portion of flap 4f. However, in this case the flap 4f has rearwardly extending fins 61 in which is tracked an extensible flap section 4f'. Section 4f' is extended and retracted by a ram 63 whose forward end is connected to flap 4f at pivot 65 and to the extensible flap at 67.

When extensible flap 4f' is retracted (FIG. 20) and flap 4f is elevated, the entrance end 26f of channel 22f is closed by the rearwardly convex trailing edge 6f of wing 2f, and the exit end of the channel is closed by proximity of extensible flap 4f'. However, when extensible flap 4f' is extended (FIG. 21), both the entrance and exit ends of the channel are opened and when flap 4f is depressed (FIG. 22) the channel functions similarly to the channels in the flaps previously described, except in that the exit end 24f of the channel is over the upper surface of the auxiliary flap.

In all the embodiments, it should be understood that the various rams, levers, arms, slots, pivots, etc. have been described in the singular, they are duplicated along the span of the wing in accordance with standard structural techniques.

I claim:
1. In an airplane
  a wing having a lower surface which in horizontal flight of the airplane extends generally horizontally,
  trailing edge unpowered geometric aerodynamic compression flap means pivoted on said wing, means in said flap means providing a rearwardly convergent channel of fixed geometry for geometrically compressing exterior air, defined on its upper and lower sides by upper and lower predominantly convergent surfaces extending therethrough for at least most of the entire width thereof from front to rear and having an intake adjacent the forward end of the flap means, and an always open exit of fixed depth in a rearward portion of the flap means wherein the compression ratio K of said channel is varied and determined according to the formula

$$K = to/tj$$

where
  $to$ = depth of intake
  $tj$ = depth of exit,
  and means for varying K between substantially zero and maximum values by closing and opening the intake, including
  means for pivoting said flap means about an axis which is fixed with respect to the wing between elevated and depressed conditions, said wing, flap means and channel being characterized by the fact that in the elevated position of the flap, said intake is disposed behind the trailing edge of the wing and the latter at least partly masks the intake, and being further characterized by the fact that the upper surface of the channel at the intake is substantially aligned with the lower surface of the wing in a depressed position of the flap means, so that air flowing along the lower surface of the wing enters the channel intake with no substantial angular change in direction at said entry, and characterized further than in the depressed position of the flap means the exit is directed downwardly and rearwardly with respect to the lower surface of the wing.

2. The combination claimed in claim 1, the means for varying K including a shutter mounted by a leading edge portion thereof for movement about a pivotal axis in said wing between an elevated position in which it lies against a lower rear portion of the wing, and an extended position in which it extends downwardly from said wing and in front of the channel intake on said flap, and means for elevating and lowering said shutter.

3. The combination claimed in claim 2, wherein a portion of the channel intake is in the lower side of the flap adjacent the front thereof, and wherein a portion of the shutter extends rearwardly from said wing, the means for elevating said flap comprising a means for biasing said shutter towards its elevated position, the means for lowering said flap shutter comprising a surface on said flap on the upper side of the channel which engages said shutter when said flap is depressed.

4. The combination claimed in claim 2, wherein a lower portion of the channel intake is in the lower side of the flap adjacent the front thereof, a shutter having a rear portion thereof pivoted to the lower side of said flap adjacent that portion of the channel intake and having a forward portion engageable against the rear portion of the wing, and means for pivoting shutter between an elevated position in which it closes the lower portion of the channel intake and a depressed position in which it extends downwardly from the lower portion of the channel intake.

* * * * *